United States Patent
Ito

(10) Patent No.: US 8,493,586 B2
(45) Date of Patent: Jul. 23, 2013

(54) WORK FLOW SYSTEM FOR DECIDING WHETHER TO EXECUTE THE WORK FLOW BASED ON FUNCTION RESTRICTION INFORMATION

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 12/632,465

(22) Filed: Dec. 7, 2009

(65) Prior Publication Data

US 2010/0141980 A1  Jun. 10, 2010

(30) Foreign Application Priority Data

Dec. 8, 2008  (JP) ................................. 2008-312378

(51) Int. Cl.
*G06K 15/00*  (2006.01)
*G06F 3/12*  (2006.01)

(52) U.S. Cl.
USPC ........................................ 358/1.14; 358/1.15

(58) Field of Classification Search
USPC ................ 358/1.1, 1.13, 1.14, 1.15; 709/213, 709/226, 237; 726/16, 21, 26, 27
See application file for complete search history.

(56) References Cited

U.S. PATENT DOCUMENTS

| 7,233,405 | B2 * | 6/2007 | Fromherz ................... 358/1.13 |
| 7,984,165 | B2 * | 7/2011 | Fujimoto et al. .............. 709/228 |
| 8,127,362 | B2 * | 2/2012 | Asahara ......................... 726/26 |
| 2006/0069926 | A1 * | 3/2006 | Ginter et al. .................. 713/194 |
| 2007/0171466 | A1 * | 7/2007 | Shigeeda ..................... 358/1.15 |
| 2008/0019593 | A1 * | 1/2008 | Kashiwagi et al. ........... 382/190 |
| 2008/0086778 | A1 |  | 4/2008 | Asahara |

FOREIGN PATENT DOCUMENTS

| JP | 2004-312302 A | 11/2004 |
| JP | 2008-098784 A | 4/2008 |

\* cited by examiner

*Primary Examiner* — Gabriel Garcia
(74) *Attorney, Agent, or Firm* — Canon USA Inc. IP Division

(57) ABSTRACT

An image processing apparatus capable of executing a work flow according to setting information indicating a processing content for combining a plurality of functions and executing the functions as a series of processings, includes: an obtaining unit configured to obtain function restriction information indicating a function whose execution is restricted among a plurality of functions provided to the image processing apparatus; a function identification unit configured to identify a function executed by the image processing apparatus and a function executed by the other apparatus on the basis of the setting information; and a decision unit configured to decide whether execution of the work flow based on the setting information is restricted on the basis of the function restriction information and the function executed by the image processing apparatus and the function executed by the other apparatus identified by the function identification unit.

13 Claims, 9 Drawing Sheets

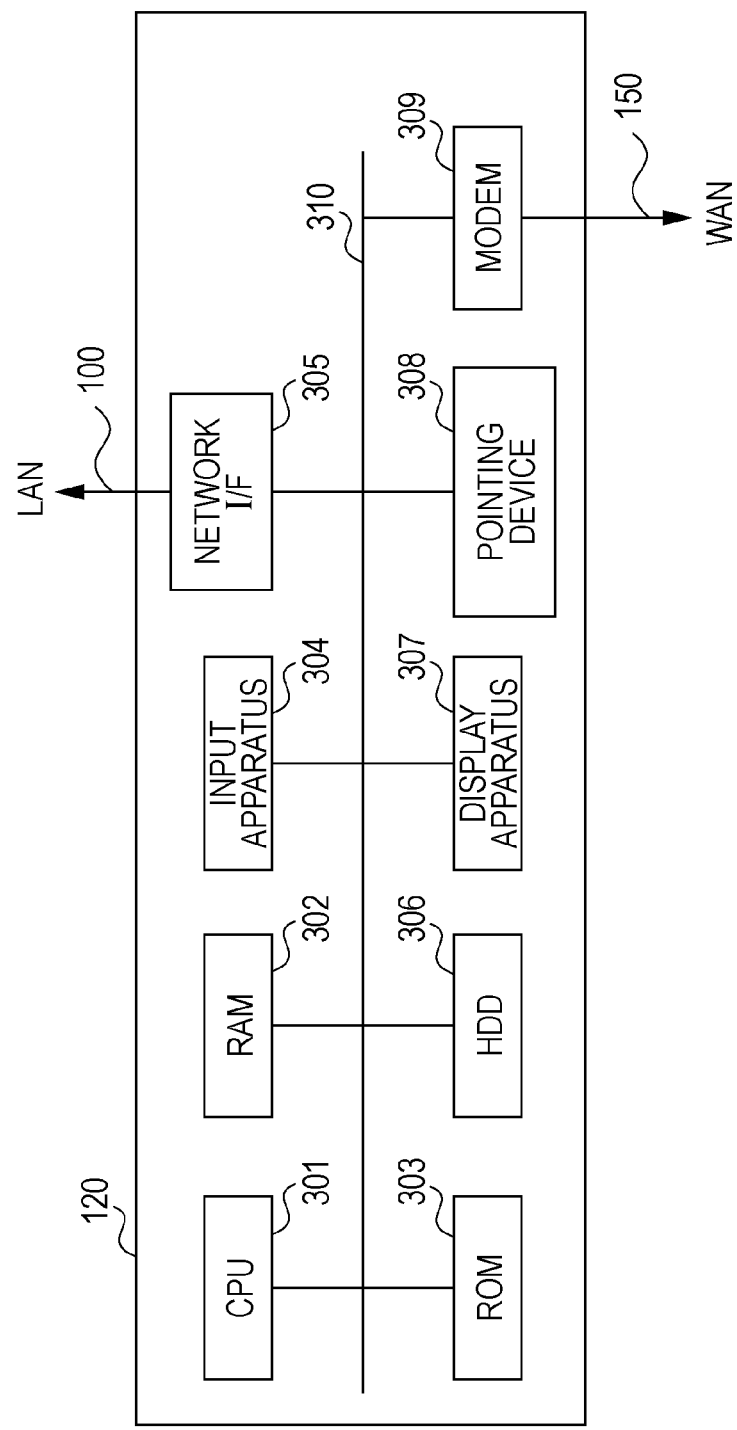

FIG. 4

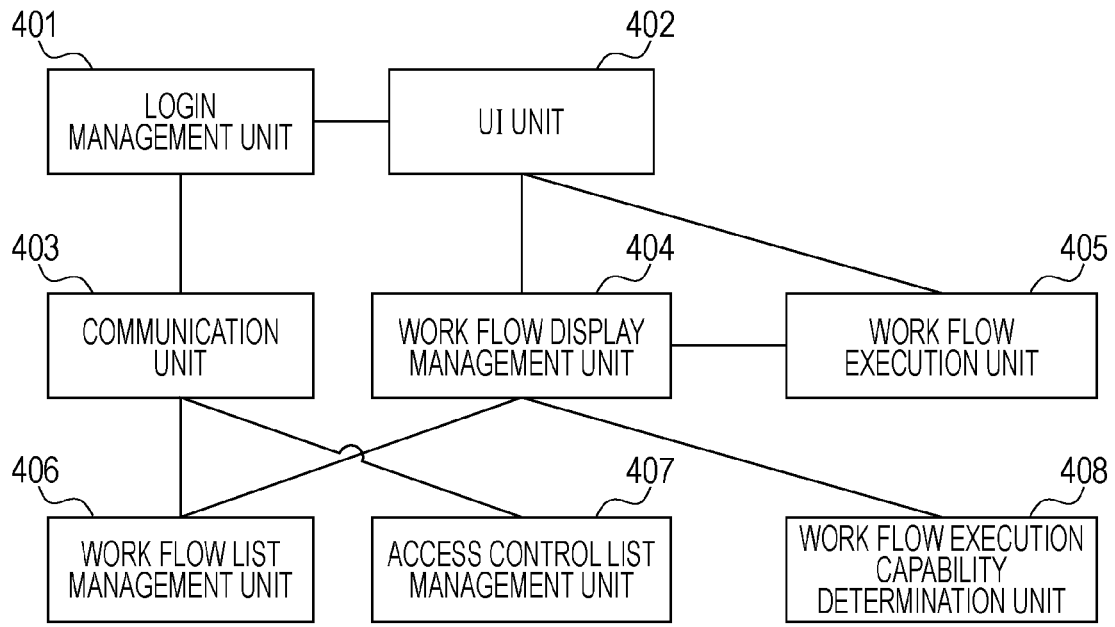

FIG. 5

```
<?xml version="1.0" encoding="utf-8" ?>
<Workflow id="123" caption="SEND MAIL" comment=".." date=".." >    ~501
  <Job id="Scan" execute="ScanDevice">
    <Setting>...</Setting>
  </Job>                                                            ~502
  <Job id="Send" execute="ScanDevice">
    <Setting>
      <Protocol>SMB</Protocol>                                      ~503
      <Destination>XXX.YY.com\input</Destination>
      ...
    </Setting>                                                      ~504
  </Job>
  <Job id="Send" execute="SendDevice">
    <Setting>
      <Protocol>FAX</Protocol>                                      ~505
      <Destination>0123456789</Destination>
      ...
    </Setting>                                                      ~506
  </Job>
</Workflow>
```

| USER ID | COPY | PRINT | SEND | | | | ... |
|---------|------|-------|------|-----------|----------|----------|-----|
| | | | | SEND MAIL | SEND SMB | SEND FAX | ... | ... |
| USER A | OK | OK | OK | OK | NG | OK | ... | ... |
| USER B | OK | OK | OK | NG | OK | NG | ... | ... |
| USER C | NG | OK | NG | — | — | — | ... | ... |
| ... | ... | ... | ... | ... | ... | ... | ... | ... |

WORK FLOW SYSTEM FOR DECIDING WHETHER TO EXECUTE THE WORK FLOW BASED ON FUNCTION RESTRICTION INFORMATION

BACKGROUND OF THE INVENTION

1. Field of the Invention

The present invention relates to an image processing apparatus and a work flow system, in particular, a work flow processing using a plurality of image processing apparatuses.

2. Description of the Related Art

In recent years, an image processing apparatus designed by using a digital multifunction peripheral provided with a scanner and a printer as a base to which a large number of functions are added has been in practical use (hereinafter, referred to as image processing apparatus). For example, a facsimile communication is performed by using the scanner and the printer originally provided to the digital multifunction peripheral. Also, by using the printer, code data which is sent from a computer is expanded to bitmap data to perform print out.

In addition, by using the scanner, an image read from the scanner is sent onto a network, and by using the printer, an image distributed from a network is printed out. The above-described addition of the functions is carried out for the image processing apparatus. Furthermore, an image processing apparatus for providing a box function is also proposed in which an area for an individual user or each of divisions is provided in a storage apparatus of the image processing apparatus, and printer images and scan images are stored in the storage area so that the images are output at any time. Moreover, a function of improving usability of a user by combining these functions in the image processing apparatus and creating a script is also provided.

Also, a function of restricting an execution of a function in the image processing apparatus is also proposed. An access control list called ACL is created for each user or each group composed of a gathering of a plurality of users, and it is accordingly possible to manage a security rule on which operation can be permitted for each of the users.

A technology is also proposed of restricting the script in equipment as the script determines a function eventually realized through a combination of functions in a case where the script is executed in the image processing apparatus having such restriction on the function. For example, Japanese Patent Laid-Open No. 2008-98784 discloses the following description. That is, a restriction is carried out in which, for example, a script combining a scan on the storage area in the image processing apparatus with a print from the storage area is regarded as an execution of a copy function, and the copy function is not executed in a case where a restriction exists on the copy function.

On the other hand, a technology is also realized in which functions of a single or a plurality of image processing apparatuses are combined as a series of flow, and by providing a unit configured to call the combination, a plurality of functions are continuously executed. An assembly of this functional series of processes is referred to as work flow. Functions included in this work flow and a set of setting values for executing the functions are referred to as work flow setting. Through a delivery and a receipt of this work flow setting between equipments, the functions are executed in the respective equipments, and the work flow is executed. Also, a work flow processing system is also proposed in which not only the functions of the digital copier based image processing apparatus but also functions of an image processing server for performing OCR, an image sending server for performing FAX sending or electronic mail sending, and the like are combined in the work flow.

However, in a case where the above-described work flow processing system is combined with the function restriction of the image processing apparatus, the following issues occur.

For example, a consideration is given on a work flow in which a scan is performed by the digital multifunction peripheral and a FAX sending is performed by the image sending server. In this case, the image sending from the digital multifunction peripheral to the image sending server is performed on the basis of an SMB (Service Message Block) protocol. At this time, a case is supposed where the FAX sending is permitted through the function restriction of the digital multifunction peripheral but the sending based on the SMB protocol is restricted. At this time, the function of sending a FAX is intended to be provided as the work flow processing system, but the SMB sending from the digital multifunction peripheral to the image sending server is restricted, and the work flow cannot be executed. On the other hand, in a case where the FAX sending is restricted but the SMB sending is permitted, as the SMB sending from the digital multifunction peripheral to the image sending server is not restricted, the image is sent to the sending server, and as a result, the work flow of the FAX sending is unintentionally realized. To elaborate, even when the facsimile sending is restricted, a function similar to the facsimile sending by the digital multifunction peripheral through the work flow can be realized by chance, which means that the function restriction is not effectively functioned. Also, according to the technology disclosed in Japanese Patent Laid-Open No. 2008-98784, a restriction on the work flow (script) executed by the single image processing apparatus can be realized. However, the technology does not call into account the work flow executed in collaboration with other equipments, and therefore the above-described problem cannot be solved.

SUMMARY OF THE INVENTION

The present invention has been made in view of the above-mentioned related art example to solve the above-mentioned issues and preferably provides a work flow system and an image processing apparatus which appropriately perform a function restriction.

According to an aspect of the present invention, an image processing apparatus capable of executing a work flow on the basis of work flow setting information indication a processing content for combining a plurality of functions and executing the functions as a series of processing is provided. The image processing apparatus includes an obtaining unit configured to obtain function restriction information indicating a function whose execution is restricted among a plurality of functions provided to the image processing apparatus. The image processing apparatus includes a function identification unit configured to, in a case where the work flow setting information indicates a processing content of a work flow executed by the image processing apparatus and another image processing apparatus collaboratively, identify a function executed by the image processing apparatus and a function executed by the other image processing apparatus on the basis of the work flow setting information. The image processing apparatus also includes a decision unit configured to decide whether execution of the work flow is restricted on the basis of the function restriction information obtained by the obtaining unit and the function executed by the image processing apparatus and the function executed by the other image processing apparatus identified by the function identification unit.

Further features of the present invention will become apparent from the following description of exemplary embodiments with reference to the attached drawings.

BRIEF DESCRIPTION OF THE DRAWINGS

FIG. 3 shows an example of a hardware configuration of a server.

FIG. 4 shows an example of a software module configuration of the digital multifunction peripheral.

FIG. 5 shows an example of work flow setting information according to an embodiment of the present invention.

DESCRIPTION OF THE EMBODIMENTS

Hereinafter, best modes for embodying the present invention will be described by using the drawings.
First Embodiment FIG. 1 is a block diagram showing an example of an entire configuration of a work flow system to which an embodiment of the present invention can be applied.

Figure 1:
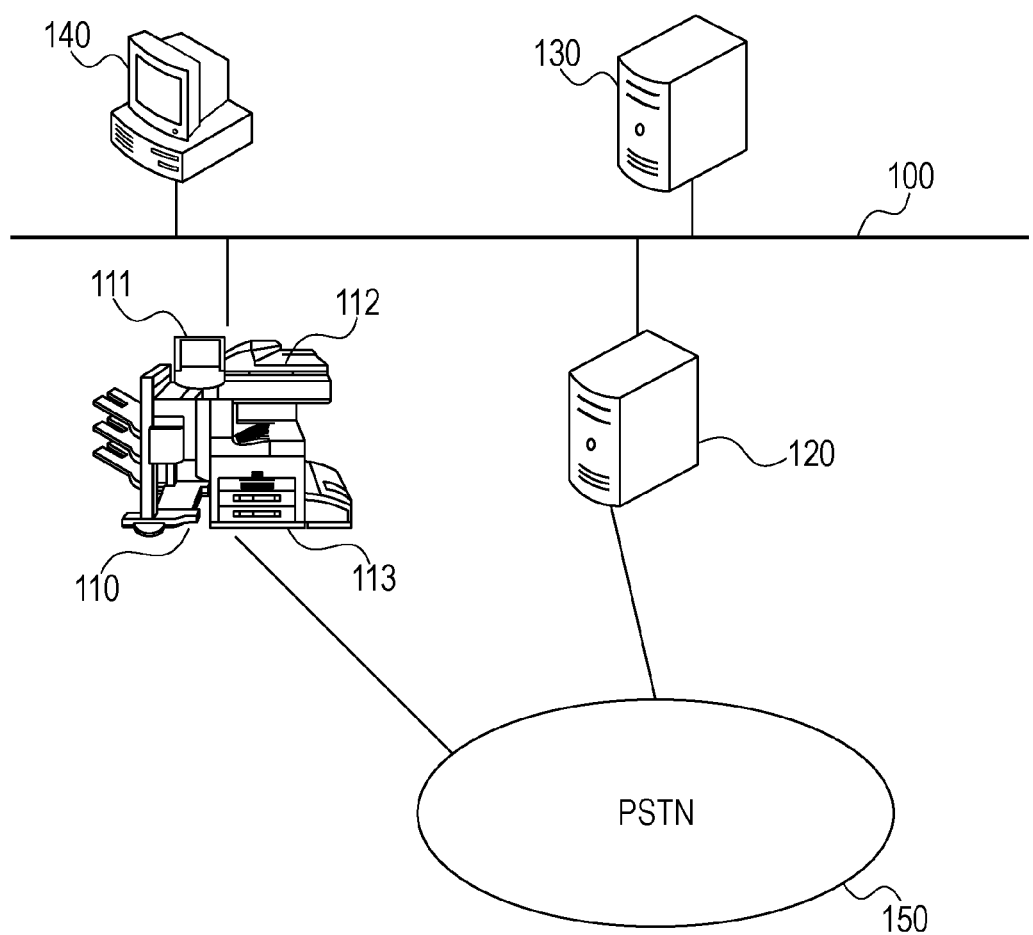
FIG. 1 shows an example of an entire configuration of a work flow system.

As shown in FIG. 1, a digital multifunction peripheral 110 which is an example of an image processing apparatus, an image sending server 120 which is an external apparatus with respect to the digital multifunction peripheral 110 or is another example of the image processing apparatus, an authorization management server 130, and a client PC 140 are connected to a LAN 100 composed of Ethernet (registered trademark) or the like. It is however noted that in the system according to the present embodiment, the number of these connections is not limited to the above-described example. Also, according to the present embodiment, the LAN is adopted as the connection method, but the connection method is not limited to this. For example, an arbitrary network such as the PSTN (public line), a serial transmission system such as USB, a parallel transmission system such as Centronics or SCSI, and the like can also be applied. Also, according to the present embodiment, the digital multifunction peripheral is a network digital multifunction peripheral configured to execute the work flow, but the image processing apparatus may also be another image processing apparatus such as a general-use computer to which a general-use scanner is connected. Also, the image sending server 120 may be an apparatus similar to the digital multifunction peripheral 110. It is however noted that the apparatus needs to be provided with a function of executing a work flow which will be described below.

The digital multifunction peripheral 110 has a copy function. Also, the digital multifunction peripheral 110 has a data sending function (hereinafter, simply also referred to as sending function) of reading an image of an original and sending image data read and obtained (which may also be referred to as document data in some cases) to a specified apparatus on the LAN 100 by using a protocol such as FTP (File Transfer Protocol) or SMB (Service Message Block) protocol. For the sending function, other than FTP or SMB, WebDAV (Distributed Authoring and Versioning protocol for the WWW) or the like may be used. Also, a facsimile (FAX) function of sending image data via the PSTN 150 is also one of the sending functions. Also, for the sending function, an E-mail is created while an image is set as an attachment file, and the E-mail can be sent by utilizing a mail server (not shown) (electronic mail function). In addition, it is possible to receive the PDL data from the client PC 140 or the like connected on the LAN 100 and provided with a PDL (Page Description Language) interpretation function and a rendering function and print the data. Also, the digital multifunction peripheral 110 can save the image data obtained by reading the original through its own scanner in a particular area of a hard disk in the digital multifunction peripheral 110. Also, the digital multifunction peripheral 110 can save the PDL data specified from the computer connected on the LAN 100 or the image data obtained by expanding the PDL data in the particular area of the hard disk in the digital multifunction peripheral 110. In addition, it is possible to print the digital image data saved in the hard disk as an image.

By receiving the image data and a work flow setting from external equipment such as the digital multifunction peripheral 110, the image sending server 120 sends the image data received on the basis of the processing content (a sending setting or the like) described in the work flow setting. According to the present embodiment, the image sending server accommodates a model and is connected to a public line (PSTN) 150, so that it is possible to perform FAX sending via a telephone line. Also, an E-mail is created while an image is set as an attachment file, and it is possible to send the E-mail by utilizing a mail server (not shown). Also, the image sending server 120 has a data sending function of sending the image data to an apparatus on the LAN 100 or an apparatus on the internet (not shown) which is connected via another LAN (not shown) or a gateway (not shown) connected or via a router (not shown) by using the FTP protocol, the SMB protocol, or the like. When these pieces of image data are sent, it is possible to execute a software application for performing an image processing described in the work flow setting.

The authorization management server 130 stores access control list (which will be hereinafter referred to as ACL) for each of the users with respect to the respective functions of the digital multifunction peripheral 110. For example, it is possible to set a function restriction related to scan of the original, save into the box, print of the document, send, copy, and the like in the digital multifunction peripheral 110. To elaborate, the ACL is an example of function restriction information. Also, at a time when the ACL for each of these users is requested from external equipment, it is possible to extract only necessary information to be sent to the requesting apparatus. The digital copier 110 obtains the ACL related to the user who utilizes the digital copier from the authorization management server and permits or restricts execution of functions while following contents described in the ACL. It is noted that according to the present embodiment, the authorization management server 130 is provided as a separate apparatus from the digital multifunction peripheral 110, but the digital multifunction peripheral 110 may also accommodate the function of the authorization management server 130.

Hardware Configuration Diagram of the Digital Multifunction Peripheral

Figure 2:
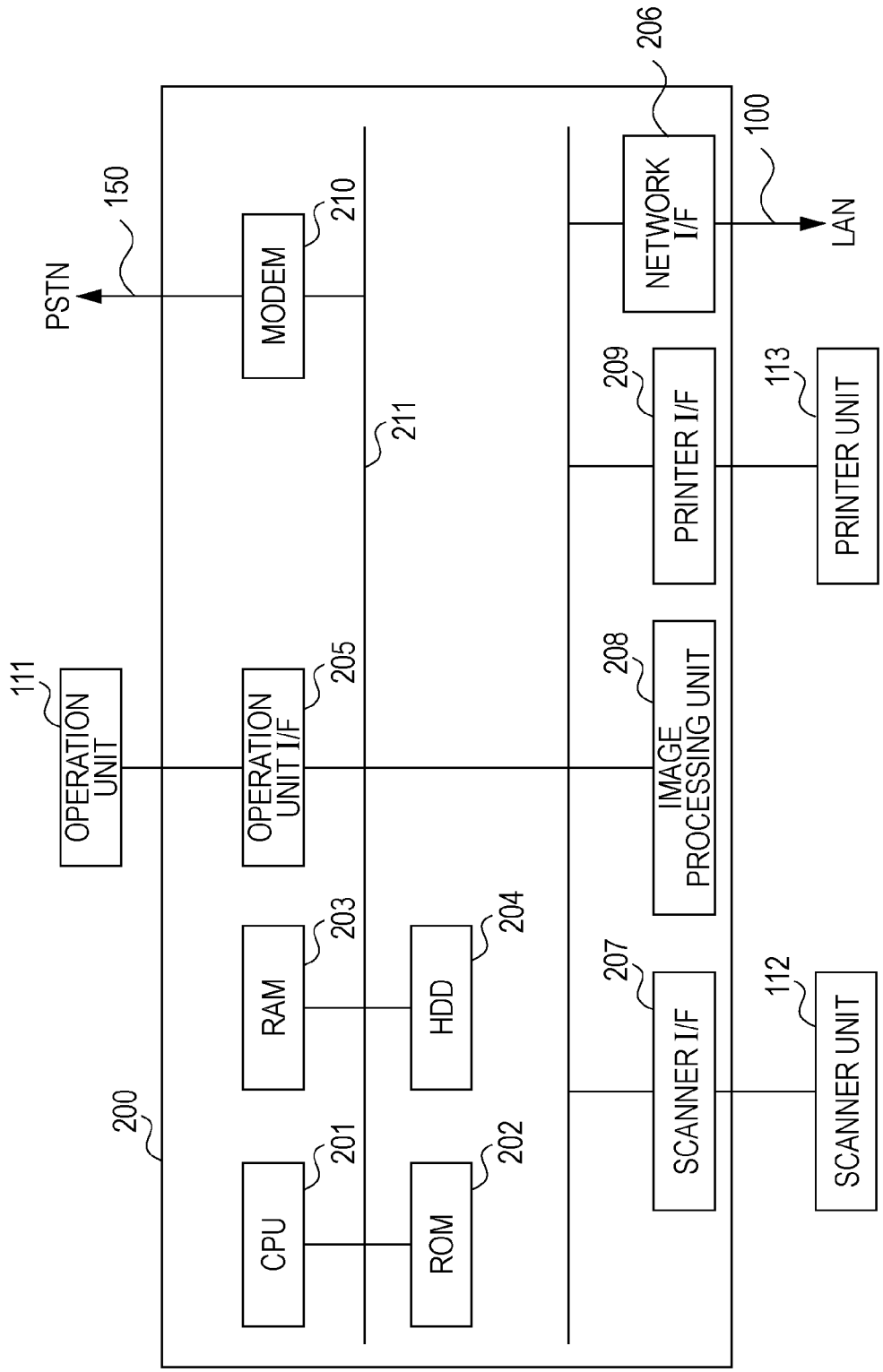
FIG. 2 shows an example of a hardware configuration of a digital multifunction peripheral.

FIG. 2 shows an example of a hardware configuration of the digital multifunction peripheral according to the present embodiment. As shown in FIG. 2, the digital multifunction peripheral 110 is composed of the following components. That is, the components include a scanner unit 112, a printer unit 113, a controller 200 for governing a control of the digital multifunction peripheral 110, and an operation unit 111.

The scanner unit 112 converts information on the image into an electric signal by inputting a reflection light obtained through exposure scanning of the image on the original into a CCD. The scanner unit 112 further converts the electric signal into luminance signals composed of the respective colors of R, G, and B and outputs the luminance signals to the controller 200 as digital image data. It is however noted that the original is set in a document feeder (not shown). When the user instructs reading start from the operation unit 111, the original reading instruction is provided from the controller 200 to the scanner unit 112. When this instruction is received, the scanner unit 112 feeds the original from an original feeder one by one to perform a reading operation of the document. It is noted that an original reading method may also be a method of performing scan of the document by placing the original on a glass face (not shown) and moving an exposure unit instead of an automatic feed system based on the original feeder.

The printer unit 113 prints the image data received from the controller 200 on the sheet (forms as the image). It is noted that according to the present embodiment, the image forming system is an electrophotography system using a photosensitive drum or a photosensitive belt, but the system is not limited to the above. For example, it is also possible to apply an inkjet system or the like for performing a print on the sheet by ejecting ink from a fine nozzle array.

The controller 200 is electrically connected to the operation unit 111, the scanner unit 112, and the printer unit 113 and is connected to the LAN 100 via a network interface 206. That is, the controller 200 is connected to the other digital multifunction peripheral (not shown), the server (the image sending server 120, the authorization management server 130, or a server which is not shown), the client PC 140, and the like, via the LAN 100. With this configuration, input and output of information related to the image data and the digital multifunction peripheral 110 can be performed.

A CPU 201 executes a control program or the like to perform an overall control on accesses to connected various digital multifunction peripherals and accesses from another digital multifunction peripheral. Along with this control, the CPU 201 also performs an overall control on various processings performed within the controller 200. This control also includes an execution of a program for realizing a procedure of FIGS. 8 and 10 which will be described below. The CPU 201 loads a program stored in a ROM 202 or an HDD 204 onto a RAM 203 for execution. The CPU 201 uses the RAM 203 as a work area for executing the program.

Figure 8:
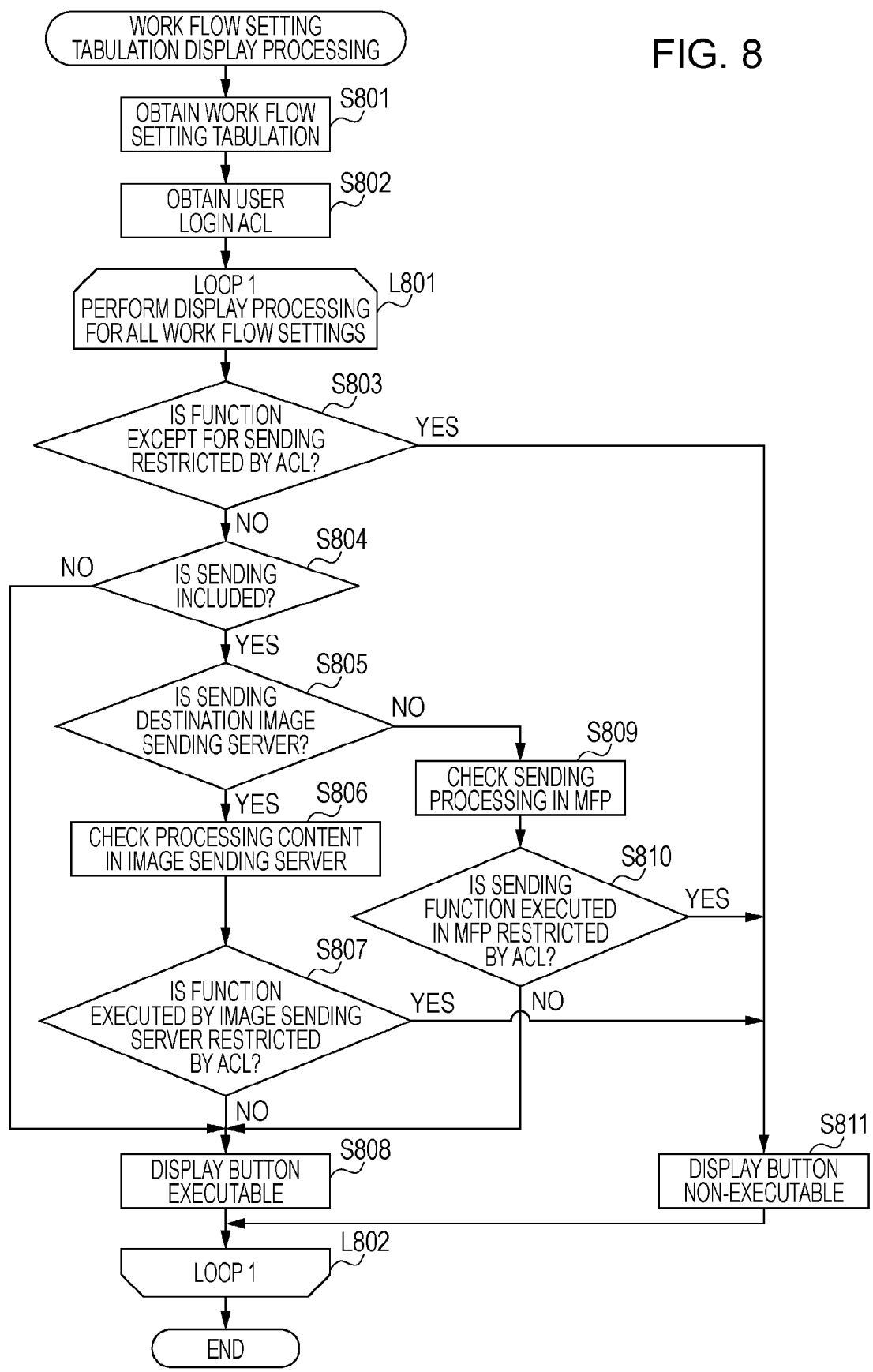
FIG. 8 is a flow chart showing an example of a tabulation display processing of work flow setting according to a first embodiment of the present invention.
Figure 10:
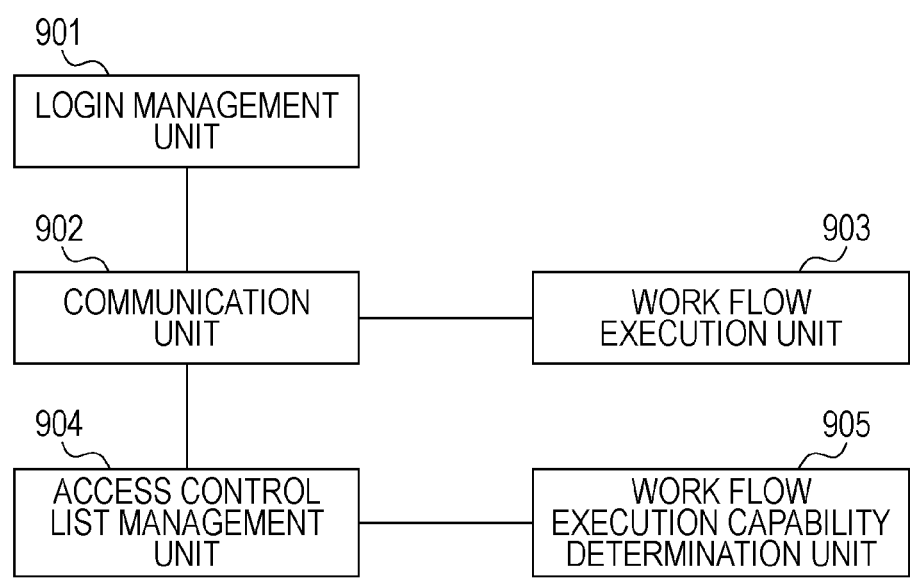
FIG. 10 shows an example of a software module configuration of an image processing server.

The ROM 202 or the HDD 204 stores a boot program for the digital multifunction peripheral 110, the program realizing the procedure of FIGS. 8 and 10, and the like. The RAM 203 is a system work memory for the CPU 201 to operate and also is a memory for temporarily storing the image data. The RAM 203 is composed of an area for holding the stored content through backup of a power source or the like even after the power source of an apparatus main body is turned OFF and an area where the stored content is deleted after the power source is turned OFF.

The HDD 204 is a hard disk drive and can store system software and the image data.

An operation unit I/F 205 is an interface unit for connecting a system bus 211 with the operation unit 111. The operation unit I/F 205 receives image data of an operation screen to be displayed on the operation unit 111 from the system bus 211 and outputs the image data to the operation unit 111. Also, the operation unit I/F 205 outputs information indicating an operation instruction input from the operation unit 111 to the system bus 211.

A network I/F 206 is connected to the LAN 100 and the system bus 211 and configured to perform input and output of information.

A scanner I/F 207 performs correction, process, and editing on the image data received from the scanner unit 112. It is noted that the scanner I/F 207 has a function of determining whether the received image data is a color original or a black-and-white original, whether the received image data is a character original or a photograph original, and the like.

An image forming unit 208 performs direction conversion, image compression, expansion, and the like of the image data. Also, it is possible to synthesize images saved in the HDD 204 into one image.

A printer I/F 209 receives the image data sent from the image forming unit 208 and applies image formation on the image data while referring to attribute data attached to this image data. The image data after the image formation is output to the printer unit 113.

A modem 210 is connected to the system bus 211 and the public line (PSTN) 150. The modem 210 is used in a case where the digital multifunction peripheral 110 executes the facsimile function.

It is noted that the user instruction to the digital multifunction peripheral 110 or information presentation to the user may be performed, for example, via the operation unit 111 or may also be performed via the client PC 140 which is connected via the LAN 100.

Hardware Configuration Diagram of the Computer

FIG. 3 is a block diagram of a hardware configuration example of the image sending server 120 shown in FIG. 1.

In FIG. 3, a CPU 301, a RAM 302, a ROM 303, a network I/F 305, and a hard disk drive (HDD) 306 are mutually connected via a system bus 310 in a communicable manner.

In addition, a display apparatus 307 such as a liquid crystal display or a CRT, an input apparatus 304 such as a keyboard, and a pointing device 308 such as a mouse are mutually connected via the system bus 310 in a communicable manner.

The ROM 303 or the HDD 306 previously stores the control program. The CPU 301 exhibits the function as the image sending server 120 by reading out the control program as occasion demands onto the RAM 302 from the ROM 303 or the HDD 306 for execution.

In addition, the CPU 301 displays various pieces of information via the display apparatus 307 and also accepts the user instruction and the like from the input apparatus 304 and the pointing device 308. Furthermore, the CPU 301 performs a communication with another apparatus on a LAN 110 via the network I/F 305. Moreover, the CPU 301 is connected to the PSTN 150 via a modem 309.

The authorization management server 130 and the client PC 140 also have a similar hardware configuration to that shown in FIG. 3 except that the modem 309 does not exist and the control program stored in the HDD 306 or the ROM 303 is different.

Software configuration diagram of the digital multifunction peripheral

FIG. 4 shows a software module configuration of the digital multifunction peripheral 110, which is related to a work flow execution processing by the digital multifunction peripheral. These software modules are stored in the HDD 204 of the digital multifunction peripheral 110 and executed by the CPU 201.

A login management unit 401 is a software module for performing user authentication in accordance with an authentication request from the operation unit I/F 205 or the network I/F 206.

A UI unit 402 is a software module for performing a display on the operation unit 111 via an operation unit I/F 405 and processing a user input from the operation unit 111.

A communication unit 403 is a software module for performing a communication by operating the network I/F 206 or the modem 210.

A work flow display management unit 404 is a software module provided with a function of selecting a work flow that should be displayed from a tabulation of the work flow settings managed by a work flow list management unit 406 for displaying the work flow on the UI unit 402. The display processing of this work flow setting will be described below.

A work flow execution unit 405 is a module for determining processings that should be executed by its own device among the work flow settings and executing those processings as jobs in the device. For example, when a processing to be executed is a scan processing, a job is executed in which the scanner unit 112 is operated to read a paper original, which is saved in the HDD 204 as image data.

The work flow list management unit 406 is a software module for managing the tabulation of the work flow settings saved in the HDD 204. It is possible to receive the work flow setting via the communication unit 403 from the client PC 140 and also possible to send the work flow setting to the client PC 140.

An access control list management unit 407 is a software module for obtaining an access control list of the logged in user from the authorization management server 130.

A work flow execution capability determination unit 408 is a software module for comparing the target work flow setting with the ACL of the user to determine whether the target work flow setting can be executed. A determination sequence on the execution capability will be described below.

Example of Work Flow Setting Information

FIG. 5 shows an example of the work flow setting file (work flow setting information) in which a work flow setting used in the present embodiment is described. FIG. 5 shows a work flow setting example in which "scanning of the image is performed by the digital multifunction peripheral to be sent to the image sending server, and the image is sent by FAX from the image sending server." The work flow execution unit 405 of FIG. 4 interprets the work flow setting described as in FIG. 5 to identify a function that should be executed in the flow and instructs the digital multifunction peripheral 110 to execute a series of processings described in the flow.

According to the present embodiment, the work flow setting files are described in an XML format. It is however noted that instead of the XML format, another format may also be use to describe the work flow setting files.

A tag 501 indicates outline information of a work flow. In an example of FIG. 5, the information includes an ID which is an identifier for uniquely identifying the work flow ("123"), a name of the work flow ("Send Mail"), a comment (omitted), a date of the creation (omitted), and the like.

A tag 502 indicates a type of a scan job performed by the digital multifunction peripheral 110 as an initial job included in the work flow and a setting content thereof. A stand-alone job included in the work flow is described for each processing of the equipment. The job type is indicated by a "Job id" attribute (in the case of the tab 502, a scan job is indicated). A reading setting is described by a subelement of this tag (a scan resolution, color reading/black-and-white reading, or the like) but omitted according to the present embodiment.

A tag 503 indicates a send job from the digital multifunction peripheral 110 to the image sending server 120 as an element job following the scan job. A subelement 504 of this tag describes settings necessary for the sending execution and the sending. In the present example, it is indicated that by using the SMB protocol, sending to the image sending server (XXX.YY.com) is performed. Regarding the sending, still another setting item may also exist, but the setting (for example, a format of the image data to be sent, or the like) is omitted herein.

A tag 505 indicates a send job from the image sending server by FAX as a following element job. A subelement 506 of this tag indicates a conduct of the FAX sending and a destination of the FAX sending. A setting necessary for the sending further exists but is omitted herein.

It is noted that an appearance order of the job tags in the work flow setting XML indicates a job processing order.

It is noted that according to the present embodiment, as a flag for indicating a conduct by the digital multifunction peripheral 110, a representation "ScanDevice" by an "execute" attribute of the "Job" tag is used. Also, as a flag for indicating a conduct by the image sending server 120, a representation "SendDevice" is used. It is however noted that any format may be used as long as the flag indicates by which device the processing in the work flow is performed. For example, the identification may be performed on the basis of an IP address of the equipment or the like, and also the representation may be performed on the basis of the order of the executing equipments.

Configuration Example of the ACL

Figures 6, 7:
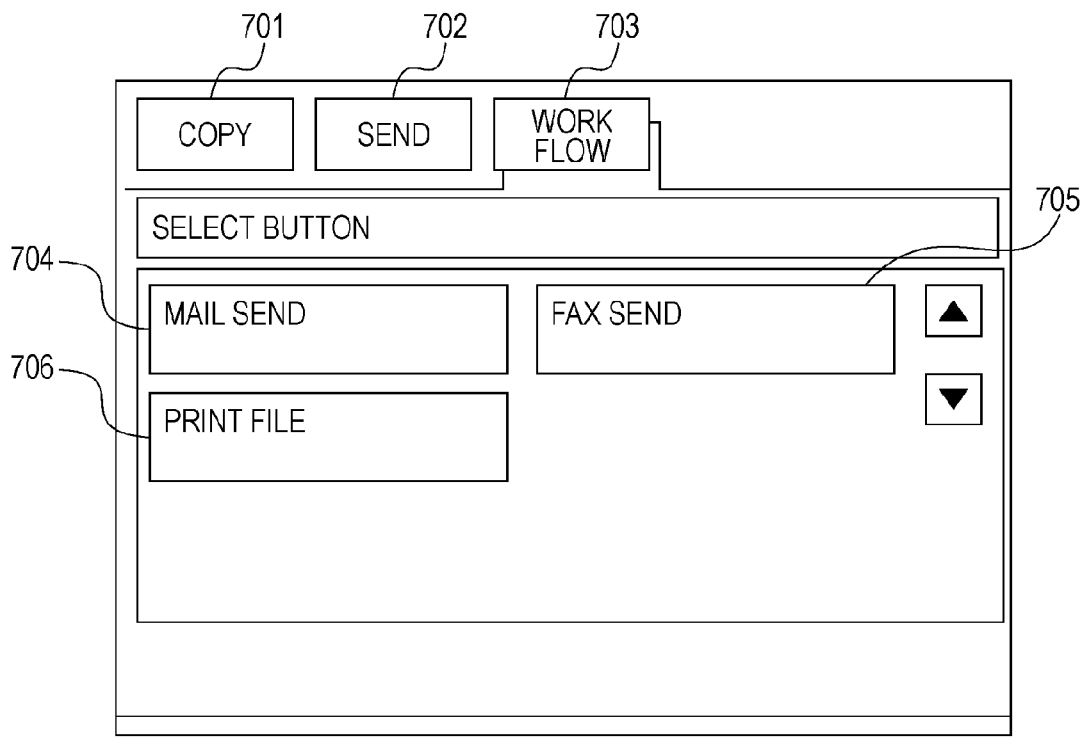
FIG. 6 shows an example of a pattern diagram of an access restriction list.
FIG. 7 shows an example of a work flow execution screen.

FIG. 6 schematically shows an example of the ACL (Access Control List) managed by the authorization management server 130 in a table. The ACL is stored in the HDD 306 of the authorization management server 130.

A column 601 of the table indicates a user ID, which is an identifier for identifying the user registered in the authorization management server 130. In the present example, the user ID doubles as an identifier of a user who logs in the digital multifunction peripheral 110. It is however noted that for a configuration, the user identifier managed by the authorization management server 130 may be different from the user identifier for logging in the digital multifunction peripheral 110. In that case, it is possible to cope with the situation while the authorization management server 130 or the digital multifunction peripheral 110 has a correspondence table for those user identifiers.

A column 602 indicates whether the user specified by the user ID is permitted to use the copy function.

A column 603 indicates whether the user specified by the user ID is permitted to use the print function.

A column 604 indicates whether the user specified by the user ID is permitted to use the sending function.

A column 605 indicates whether the user specified by the user ID is permitted to perform sending through an E-mail.

A column 606 indicates whether the user specified by the user ID is permitted to perform sending through the SMB protocol.

A column 607 indicates whether the user specified by the user ID is permitted to perform FAX sending.

In a case where the user is not permitted to have the sending function in the column 604, the settings of the columns 605, 606, and 607 are ignored, and the sending is not permitted.

For example, it is indicated that a user identified by "user A" can perform copy and print but is not permitted to perform sending through the SMB protocol.

The ACL of FIG. 6 schematically shows the table, but in actuality, the data described in the XML format or the like is saved in the HDD 306 of the authorization management server 130.

Execution Screen of the Work Flow

Next, a description will be provided of a UI for executing the work flow by the digital multifunction peripheral 110.

FIG. 7 shows a screen displayed on the operation unit 111 when the work flow is executed. The operation unit 111 is composed of a touch panel, and buttons (keys) for accepting a key input can be displayed as a screen.

Buttons 701, 702, and 703 are buttons for switching the applications (functions) on the image forming apparatus 110.

The button 701 is a button for executing a copy application, the button 702 is a button for executing a sending application, and the button 703 is a button for displaying a screen of an application for executing the work flow (hereinafter, referred to as work flow application). FIG. 7 shows a state in which the screen of the work flow application is displayed as the button 703 is pressed.

Buttons 704, 705, and 706 are buttons for calling and executing the work flow setting displayed on the screen of the work flow application.

Flow of a Work Flow Execution Restriction Processing

Hereinafter, a description will be provided on how the execution of the work flow is appropriately restricted in the digital multifunction peripheral 110.

The work flow setting files are previously created by the application on the client PC 140 and set in the digital multifunction peripheral 110 via the network. In the present example, a process thereof will be omitted. In the present example, a description will be provided on the basis of a situation in which the work flow setting files shown in FIG. 5 are set in the digital multifunction peripheral 110.

These flows are realized while the CPU 201 executes the programs of the respective software modules.

First, in order to execute the work flow, the user logs into the digital multifunction peripheral. In the present example, a login screen or a procedure is omitted. In order to log into the digital multifunction peripheral, it may be configured that the login management unit 401 instructs the UI unit 402 to input a user ID and a password with respect to a login screen (not shown) displayed on the operation unit 111. Also, it may also be configured that an IC card is exposed to an IC card reader (not shown). Any method can be adopted as long as the digital multifunction peripheral functions as a unit to identify the user. It is noted that the user identifier of the logged in user is managed by the login management unit 401.

In response to a situation where the login management unit 401 recognizes that the user logs in, the restriction function list management unit 407 obtains the ACL related to the logged in user from the authorization management server 130. The function control list management unit 407 is connected to the authorization management server 130 through the network via the communication unit 403 and obtains the function restriction corresponding to the identifier of the logged in user.

Next, a flow of displaying the tabulation of the work flow setting files in a case where the user presses the button 703 of FIG. 7 will be described.

FIG. 8 is a flow chart showing an example of a processing of displaying the tabulation of the work flow setting files in the digital multifunction peripheral. As the CPU 201 of the digital multifunction peripheral 110 executes the program module shown in FIG. 4, the present processing is realized.

In step S801, in response to an instruction from the work flow display management unit 404, the work flow list management unit 406 obtains the tabulation of the work flow setting information saved in the digital multifunction peripheral 110 to be passed over to the work flow execution capability determination unit 408.

In step S802, in response to an instruction from the work flow execution capability determination unit 408, the access control list management unit 406 obtains the ACL (function restriction information) which is obtained from the authorization management server 130 at the time of the login.

Then, a processing of a loop 1 from L801 to L802 is executed with respect to the obtained work flow setting information. Hereinafter, in the loop 1, a display processing for the work flow setting information is performed.

In step S803, first, the work flow execution capability determination unit executes an interpretation of the work flow and performs a function identification processing for identifying a function executed by the digital multifunction peripheral 110 and then a function executed by the image sending server 120. Then, it is decided whether a function except for the function related to the sending function among the processings described in the work flow setting information is restricted by the ACL of the logged in user. The function except for the function related to the sending function includes, for example, the scan function, the print function, or the box save function. In a case where the work flow execution capability determination unit decides that the function except for the sending function is restricted by the ACL, the flow advances to step S811, and in a case where it is determined that the function except for the sending function is not restricted by the ACL, the flow advances to step S804. It is noted that at the time of the determination in step S803, a determination logic with which a combination of functions is regarded as another function may be added as in the related art technology (Japanese Patent Laid-Open No. 2008-98784).

In step S804, it is determined whether the work flow setting information of the processing target includes the sending processing. In a case where the sending processing is included, the flow advances to step S805, and in a case where the sending processing is not included, the flow advances to step S807.

In the subsequent processing, among the processings described in the work flow setting information, the execution capability determination on the sending function is performed.

In step S805, it is determined whether the sending processing is included in the work flow setting information of the processing target and also the sending destination is the image sending server 120. To be more specific, the description in the XML of the work flow setting information is analyzed to pick up one with the "Job" tag in which the "Job id" attribute is "send" and the "execute" attribute is "ScanDevice." Then, the "setting" tag with respect to the job is checked, and whether the "Destination" tag describes the address indicating the image sending server 120 (for example, in the case of FIG. 5, XXX.YY.com) is checked. When the address indicating the image sending server 120 is described, it is determined that the sending destination is the image sending server 120, and the flow advances to step S806. On the other hand, when the address indicating the image sending server 120 is not described, it is determined that the sending destination is not the image sending server 120, and the flow advances to step S809. When the image sending server 120 is specified as the sending address, this work flow setting is a work flow executed by the digital multifunction peripheral 110 and the image sending server 120 collaboratively.

According to the present embodiment, the destination of the image sending server 120 is previously set in the digital multifunction peripheral 110. As another method, a communication may be performed dynamically with the image sending server for the determination, and a method may also be adopted in which the destination of the image sending server is described in a definition file of the work flow for the comparison therewith.

In step S806, the function executed by the digital multifunction peripheral 110, that is, the content of the processing executed by the image sending server 120 is checked. The XML which is the description content of the work flow setting is analyzed to pick up one with the "Job" tag in which the "execute" attribute is "SendDevice." For example, in the case of the work flow setting information shown in FIG. 5, a function executed by a component except for the digital multifunction peripheral 110 is the "Send" function indicated by the tag 505, and the "FAX sending" function is determined from the subelement "Protocol."

In step S807, the work flow execution capability determination unit 408 determines whether the function executed by the image sending server 120 is a function restricted by the ACL. In the case of the work flow setting information of FIG. 5, it is determined whether the "FAX sending" function identified by the subelement "Protocol" of the "Send" function indicated by the tag 505 is currently permitted or restricted to the digital multifunction peripheral 110. In step S807, it is not determined whether the processing of sending the image data from the digital multifunction peripheral 110 to the image sending server 120 is a restriction target by the ACL. For example, in the case of the work flow shown in FIG. 5, the function of the target to be compared with the ACL is the "FAX sending" function while excluding the "SMB protocol based sending" function on the basis of the determination in step S805. As a result of the determination in step S807, in a case where it is decided that the function executed by the image sending server 120 is restricted, the flow advances to step S811, and in a case where it is decided that the function is not restricted, the flow advances to step S808.

On the other hand, in step S805, in a case where the sending destination is not the image sending server, it is regarded that this work flow setting information is not a work flow executed by the digital multifunction peripheral 110 operating collaboratively with the image sending server 120 but is a work flow executed by the digital multifunction peripheral 110 alone. In view of the above, the flow advances to step S809, and the work flow execution capability determination unit 408 checks the sending protocol described in the "Protocol" tag of the "Job" tag in which the subelement described in the work flow setting information is "Send" to determine whether this is restricted by the ACL. In a case where this is restricted (Yes in step S810), the flow advances to step S811, and in a case where this is not restricted (No in step S810), the flow advances to step S808.

As a result of the above-mentioned determination, in a case where it is decided that the login user can execute the work flow, step S808 is executed. In step S808, in response to an instruction form the work flow execution capability determination unit 408 to the work flow display management unit 404, the work flow display management unit 404 displays the button executable for the UI unit 402 to execute the target work flow.

On the other hand, as a result of the above-mentioned determination, in a case where it is decided that the execution of the work flow by the login user is restricted, step S811 is executed. In step S811, in response to an instruction from the work flow execution capability determination unit 408 to the work flow display management unit 404, the work flow display management unit 404 displays the button non-executable for the UI unit 402 not to execute the target work flow. The display in the non-executable state herein indicates a state in which the user cannot press the button (for example, grayout display or shaded display) or the like. Also, a processing configuration may be adopted that the button is not displayed.

After that, as the user presses the button (for example, any one of the buttons 704 to 706), the processing of the corresponding work flow is started. If the work flow whose execution is instructed is executed by the digital multifunction peripheral 110 operating collaboratively with the image sending server 120, the processing is executed in the following manner. That is, the digital multifunction peripheral 110 executes the execution following the work flow and then sends the image data related to the processing and the work flow setting information to the image sending server 120. The image sending server 120 receives the image data and the work flow setting information and executes the processing that should be processed by itself among the work flow setting information. As a result, for example, the processing is performed of sending the image data scanned by the digital multifunction peripheral 110 via the image sending server 120 to a predetermined destination by FAX.

The above is processing of displaying the tabulation of the work flows in the digital multifunction peripheral 110. With this processing, as only the work flow is displayed which is permitted by the ACL for the login user to execute, in accordance with the setting of the ACL, the restriction on the execution of the work flow can be carried out. Furthermore, the function executed by the digital multifunction peripheral 110 is not simply compared with the restriction based on the ACL, but as to the work flow executed by the digital multifunction peripheral 110 and the image sending server 120 collaboratively, the comparison with the ACL is performed while the function achieved by the collaborative operation is taken into account. For example, according to the related art configuration, in a case where the "user A" in the ACL of FIG. 6 executes the work flow of FIG. 5, as the SMB protocol based sending from the digital multifunction peripheral 110 is performed, the execution is prohibited due to the restriction of the ACL for the user A. However, according to the present configuration, the execution of the work flow is not disturbed. Also, according to the related art configuration, in a case where "user B" executes the work flow of FIG. 4, the execution of the FAX sending by the image sending server 120 can be performed as the ACL restriction on the "user B" is not effected. However, according to the present configuration, the execution of the work flow can be restricted by the restriction of the ACL.

With this configuration, it is possible to restrict the function primarily desired to be restricted by the ACL while also coping with a case in which a plurality of apparatuses perform the processing collaboratively.

Second Embodiment

According to the above-described embodiment, the number of the image processing apparatuses is two including the digital multifunction peripheral 110 and the image sending server 120, but the number of the image processing apparatuses is not limited according to an embodiment of the present invention. For example, an image processing server for a separate image process (for example, an OCR processing) may also intermediate between the processings by the digital multifunction peripheral 110 and the image sending server 120. In that case too, such a processing is performed that, in step S806, the processing in the image processing server is determined, and in step S807, the communication processing from the digital multifunction peripheral 110 to the image processing server and the communication processing from the image processing server to the image sending server 120 are not set as the determination targets. In this manner, even in a case where the number of the image processing apparatuses which execute the work flow collaboratively is three or more, it is possible to cope with the situation.

Also, according to the first embodiment, the work flow is processed in serial through the respective image processing apparatuses, but the flow may be branched in mid-course. For example, this is an example in which the sending is performed from the digital multifunction peripheral 110 to the two image processing servers. In this case too, such a processing is performed that, in step S806, the processings in the respective image sending servers are determined, and in step S807, the communication processing from the digital multifunction peripheral 110 to the respective image sending servers are not set as the determination targets. In this manner, even in a case where the work flow is branched in mid-course, it can cope with the situation.

Figure 9:
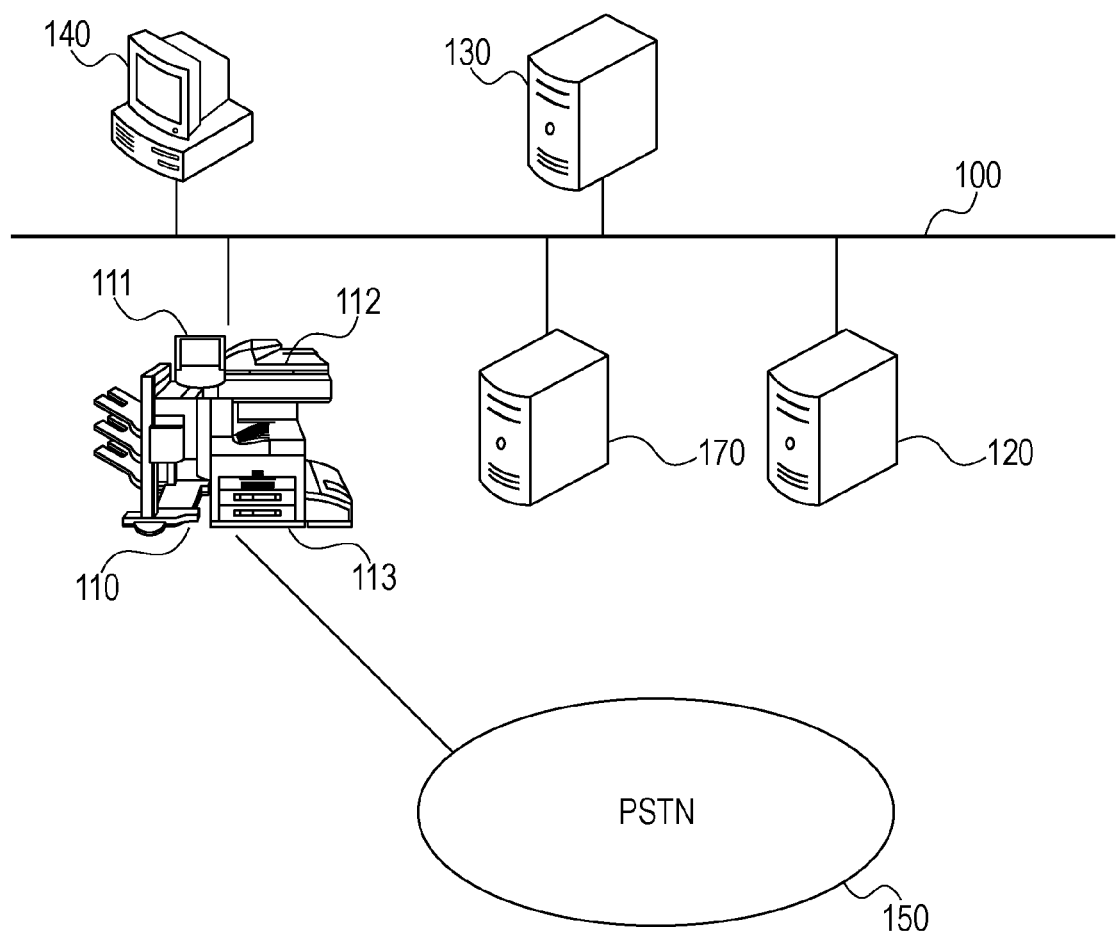
FIG. 9 shows an entire configuration of a work flow system according to a second embodiment of the present invention.

FIG. 9 is a block diagram of an entire configuration example of a work flow system according to a second embodiment. It is noted that the same components as those in the entire configuration shown in FIG. 1 are denoted by the same symbols as those in FIG. 1, and a description thereof will be omitted. In FIG. 9, in addition to the configuration of FIG. 1, an image processing server 170 is added. In a work flow system of FIG. 9, the image data sent from the digital multifunction peripheral 110 is received by the image processing server 170. The image processing server 170 executes various image processings on the received image data (a resolution conversion, a format conversion, a rotation processing, various color image processings, an OCR processing, an image area separation processing, and the like) and sends the image data after the processing to the image sending server 120. The content of the image processing executed by the image processing server 170 is described in the work flow setting information. The image sending server 120 receives the image data sent from the image processing server 170 and sends the image data to a predetermined destination while following the work flow setting information. It is noted that the digital multifunction peripheral 110, the image sending server 120, a hardware configuration of the authorization management server 130 is similar to that described according to the first embodiment and is the same as those shown in FIGS. 2 and 3. Also, the image processing server 170 is provided with hardware configuration shown in the FIG. 3. The CPU 301 of the image processing server 170 executes the above-described various image processings.

In addition, according to the first embodiment, the digital multifunction peripheral 110 determines whether the work flow is executed or restricted, but another image processing apparatus which collaboratively executes the work flow may interrupt. For example, instead of the digital multifunction peripheral 110, the image processing server 170 may determine whether the processing is executed or interrupted.

FIG. 10 shows a software configuration of the image processing server 170 according to the second embodiment.

Software modules 901 to 905 respectively correspond to the software modules of FIG. 4, and functions of the respective program modules are the same as those described in FIG. 4, so that a description will be omitted. The software modules of FIG. 10 are stored in the HDD 306 of FIG. 3 and executed by the CPU 301 of the image processing server 170. It is however noted that the image sending server 120 may be provided with a similar program module.

Figure 11:
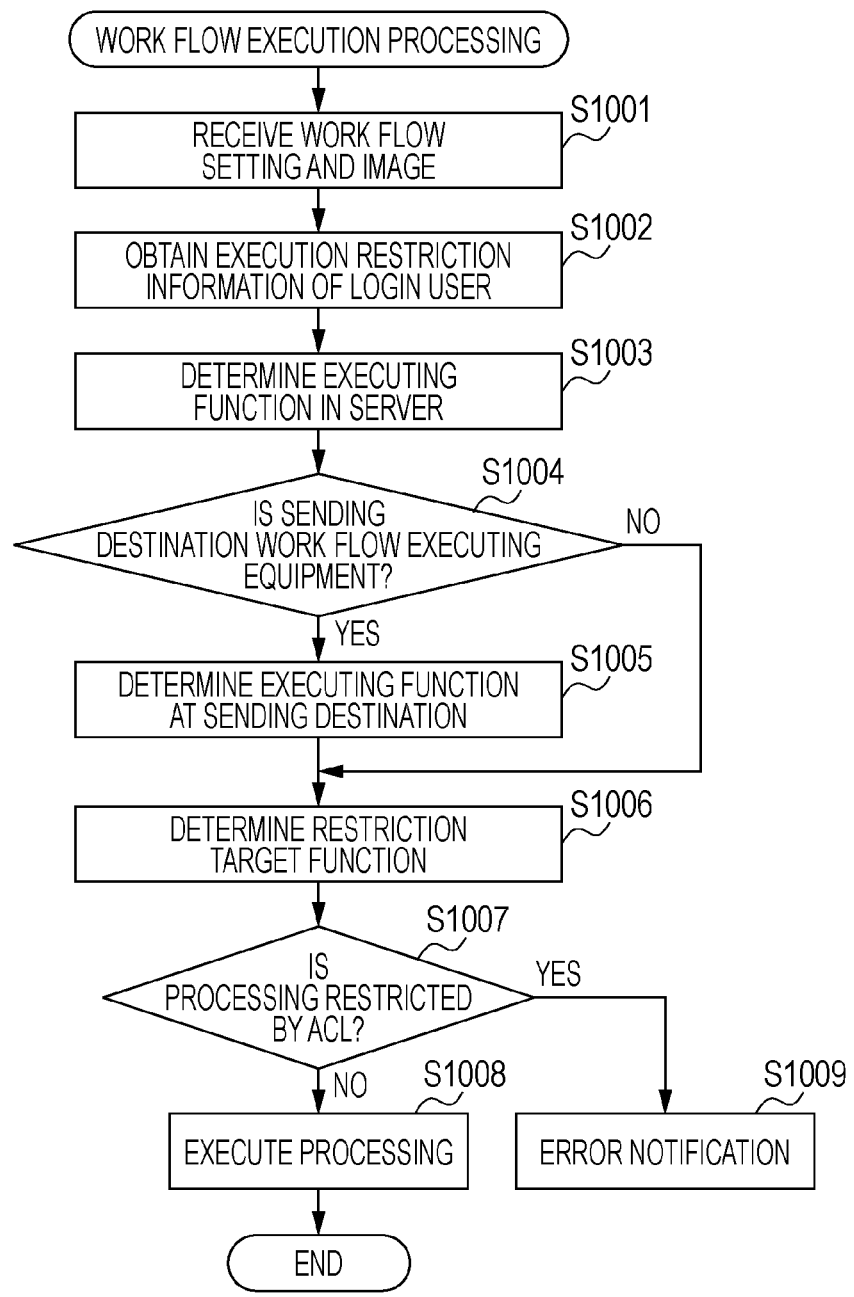
FIG. 11 is a flow chart showing an example of a work flow execution processing according to the second embodiment of the present invention.

FIG. 11 is a flow chart showing processings executed by the image processing server 170 receiving an image file and a work flow setting from the digital multifunction peripheral 110. These processings are realized while the CPU 301 executes the software modules of FIG. 10.

In step S1001, the communication unit 902 receives the work flow setting information and the image file from the digital multifunction peripheral 110. At this time, authentication information of the user who logs into the digital multifunction peripheral 110 and instructs the execution of the work flow is also received. The received image file and the work flow setting are temporarily saved in the HDD 306. Then, the execution of the work flow is instructed from the communication unit 902 to the work flow execution unit 903. In accordance with that, the work flow execution unit 903 requests a work flow execution capability determination unit 905 to perform a determination on the execution. The work flow to be executed by the image processing server is a processing described at a part where the "execute" attribute of the "Job" tag indicates its own apparatus (for example, one in which "ImageProcessingDevice" is described) among the received work flow setting information.

In step S1002, the work flow execution capability determination unit 905 performs an instruction to the access control list management unit 406, and the access control list management unit 406 obtains the ACL. The access control list management unit 406 inquires the authorization management server 130 on the basis of the authentication information of the user received in step S1001 and obtains the ACL.

In step S1003, similarly as in step S804, with respect to the work flow setting information, the determination is performed on the functions executed in the image processing server 170.

In step S1004, among the functions determined in step S1003, it is determined whether the sending to another equipment (for example, the image sending server 120) which executes the work flow next is included. In a case where it is determined that the sending to the other equipment which executes the work flow is included, the flow shifts to step S1005, and in a case where it is determined that the sending is not included, the flow shifts to step S1006.

In step S1005, a function executed by another equipment which executes the work flow next is determined.

In step S1006, on the basis of the function executed by the image processing server 170 and the function executed by the equipment which executes the work flow next except for the image processing server 170, a function of the target where the comparison with the ACL is performed is determined. At this time, the sending function between the equipments which execute the work flow is excluded from the determination.

In step S1007, the function of the restriction target determined in step S1006 is compared with the ACL obtained in step S1002 to determine whether the processing of the work flow to be executed is a processing restricted by the ACL. In a case where the processing is not restricted by the ACL, the flow is shifted to step S1008, and in a case where the processing is restricted, the flow is shifted to step S1009.

In step S1008, this is the case where it is determined that the work flow can be executed, and an instruction is issued from the work flow execution capability determination unit 905 to the work flow execution unit 903. In response to the instruction, the work flow execution unit 903 executes the processing that should be performed by the image sending server 120 in the work flow.

In step S1009, this is the case where it is determined that the work flow cannot be executed, and an instruction is issued from the work flow execution capability determination unit 905 to the work flow execution unit 903. In response to the instruction, the work flow execution unit 903 cancels the processing. At this time, via the communication unit, the error may be sent to the digital multifunction peripheral 110 which is the sending source, or the log may be left as an error log in the image sending server.

The above is the processing carried out in a case where the function restriction is performed in the image processing server 170. With this configuration, it is possible to restrict the execution of the work flow whose execution should be restricted by the ACL in the image processing apparatus during the course of the work flow execution.

Other Embodiments

According to the first and second embodiments, the work flow setting is saved in the digital multifunction peripheral 110, but a configuration may also be adopted that a separate work flow server (not shown) for holding the work flow setting is prepared. In this case, the work flow server is connected through the network to the digital multifunction peripheral 110. Then, a configuration is adopted that instead of obtaining the tabulation of the work flow setting information saved in the digital multifunction peripheral 110 through the processing in step S801 by the digital multifunction peripheral 110, the tabulation is obtained from the work flow server.

Also, the authorization management server 130 may hold the work flow setting. To elaborate, the authorization management server 130 is configured to be also provided with the above-described work flow server. The digital multifunction peripheral 110 obtains the ACL from the authorization management server 130 at the time of login and also obtains the work flow setting information from the authorization management server 130 when the flow chart of FIG. 8 is executed. Furthermore, in this case, the processing of the loop 1 in the flow chart of FIG. 8 may be performed by the authorization management server 130. To elaborate, the authorization management server 130 determines whether the execution of the work flow is restricted by the ACL related to the logged in user and sends only the executable work flow setting information to the digital multifunction peripheral 110. Then, the digital multifunction peripheral 110 displays a button related to the work flow setting information received from the authorization management server 130 on the operation unit 111. With this configuration, the effects equivalent to the first embodiment can be obtained.

In addition, according to the above-described embodiments, the ACL is obtained from the authorization management server 130 but may be configured to be set in the digital multifunction peripheral 110. In this case, the digital multifunction peripheral 110 is configured to be provided with the function of the authorization management server 130 and obtains the ACL stored in the HDD 204 instead of obtaining the ACL from the authorization management server 130 at the time of login.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-312378 filed Dec. 8, 2008, which is hereby incorporated by reference herein in its entirety.

What is claimed is:

1. An image processing apparatus capable of executing a work flow on the basis of work flow setting information indicating a processing content for combining a plurality of functions and executing the functions as a series of processing, the image processing apparatus comprising:

an obtaining unit configured to obtain function restriction information indicating a function whose execution is restricted among a plurality of functions provided to the image processing apparatus;

a function identification unit configured to, in a case where the work flow setting information indicates a processing content of a work flow executed by the image processing apparatus and another image processing apparatus collaboratively, identify a function executed by the image processing apparatus and a function executed by the other image processing apparatus on the basis of the work flow setting information; and a decision unit configured to decide whether execution of the work flow based on the work flow setting information is restricted on the basis of the function restriction information obtained by the obtaining unit and the function executed by the image processing apparatus and the function executed by the other image processing apparatus identified by the function identification unit.

2. The image processing apparatus according to claim 1, wherein the decision unit decides whether the execution of the work flow based on the work flow setting information is restricted on the basis of whether the function executed by the other image processing apparatus identified by the function identification unit is a function whose execution is restricted on the basis of the function restriction information.

3. The image processing apparatus according to claim 2, wherein in a case where the decision unit decides that the function executed by the other image processing apparatus is a sending function of sending image data and the function restriction information indicates that execution of the sending function is restricted, the execution of the work flow based on the work flow setting information is restricted.

4. The image processing apparatus according to claim 1, further comprising:

a distinguishing unit configured to, in a case where the processing content indicated by the work flow setting information includes a processing of sending image data to the other image processing apparatus, distinguish that the processing indicated by the work flow setting information is a work flow executed with the other image processing apparatus collaboratively, and in a case where the processing content indicated by the work flow setting information includes a processing of sending image data to an apparatus different from the other image processing apparatus, distinguish that the processing indicated by the work flow setting information is not the work flow executed with the other image processing apparatus collaboratively.

5. The image processing apparatus according to claim 1, further comprising:

an operation unit configured to display a screen for operating the image processing apparatus and accept an input of an operation instruction by a user;

wherein, the operation unit does not accept an instruction for executing the work flow whose execution is decided to be restricted by the decision unit.

6. The image processing apparatus according to claim 5, wherein the operation unit can display a button for accepting an instruction for executing the work flow and does not display a button for accepting an instruction for executing the work flow whose execution is decided to be restricted by the decision unit.

7. The image processing apparatus according to claim 1, wherein the image processing apparatus is connected to an authorization management server configured to manage the function restriction information in a communicable manner, and
wherein the obtaining unit obtains the function restriction information from the authorization management server.

8. A work flow system capable of executing a work flow on the basis of work flow setting information indicating a processing content for combining a plurality of functions and executing the functions as a series of processing, the work flow system comprising:
   a first image processing apparatus;
   a second image processing apparatus;
   an obtaining unit configured to obtain function restriction information indicating a function whose execution is restricted among a plurality of functions provided to the first image processing apparatus;
   a function identification unit configured to, in a case where the work flow setting information indicates a processing content of a work flow executed by the first image processing apparatus and the second image processing apparatus collaboratively, identify a function executed by the first image processing apparatus and a function executed by the second image processing apparatus on the basis of the work flow setting information; and
   a decision unit configured to decide whether the work flow system restricts execution of the work flow based on the work flow setting information on the basis of the function restriction information obtained by the obtaining unit and the function executed by the first image processing apparatus and the function executed by the second image processing apparatus identified by the function identification unit.

9. The work flow system according to claim 8 further comprising:
   an authorization management server configured to manage the function restriction information,
   wherein the obtaining unit obtains the function restriction information from the authorization management server.

10. The work flow system according to claim 9, wherein the authorization management server obtains information for identifying a user logging into the first image processing apparatus to identify the function restriction information corresponding to the user, and
   wherein the obtaining unit obtains the identified function restriction information.

11. The work flow system according to claim 8 further comprising:
   a third image processing apparatus capable of executing the work flow by operating with the first image processing apparatus and the second image processing apparatus collaboratively,
   wherein the function identification unit identifies the function executed by the first image processing apparatus, the function executed by the second image processing apparatus, and a function executed by the third image processing apparatus, and
   wherein the third image processing apparatus decides whether the execution of the work flow based on the work flow setting information is restricted on the basis of the function executed by the second image processing apparatus, the function executed by the third image processing apparatus, and the function restriction information.

12. A control method for an image processing apparatus capable of executing a work flow on the basis of work flow setting information indicating a processing content for combining a plurality of functions and executing the functions as a series of processing, the method comprising:
   obtaining function restriction information indicating a function whose execution is restricted among a plurality of functions provided to the image processing apparatus;
   identifying, in a case where the work flow setting information indicates a processing content of a work flow executed by the image processing apparatus and another image processing apparatus collaboratively, a function executed by the image processing apparatus and a function executed by the other image processing apparatus on the basis of the work flow setting information; and
   deciding whether execution of the work flow based on the work flow setting information is restricted on the basis of the obtained function restriction information and the identified function executed by the image processing apparatus and the identified function executed by the other image processing apparatus.

13. A non-transitory storage medium storing a control program for instructing an image processing apparatus capable of executing a work flow on the basis of work flow setting information indicating a processing content for combining a plurality of functions and executing the functions as a series of processing to execute a control method, the method comprising:
   obtaining function restriction information indicating a function whose execution is restricted among a plurality of functions provided to the image processing apparatus;
   identifying, in a case where the work flow setting information indicates a processing content of a work flow executed by the image processing apparatus and another image processing apparatus collaboratively, a function executed by the image processing apparatus and a function executed by the other image processing apparatus on the basis of the work flow setting information; and
   deciding whether execution of the work flow based on the work flow setting information is restricted on the basis of the obtained function restriction information and the identified function executed by the image processing apparatus and the identified function executed by the other image processing apparatus.

* * * * *